(12) United States Patent
Burkhard et al.

(10) Patent No.: US 9,146,149 B2
(45) Date of Patent: Sep. 29, 2015

(54) FORCE-TRANSMITTING MECHANISM WITH A CALIBRATION WEIGHT THAT CAN BE COUPLED AND UNCOUPLED

(75) Inventors: Hans-Rudolf Burkhard, Wila (CH); Ferdinand Schneider, Winterthur (CH)

(73) Assignee: Mettler-Toledo AG, Greifensee (CH)

( * ) Notice: Subject to any disclaimer, the term of this patent is extended or adjusted under 35 U.S.C. 154(b) by 662 days.

(21) Appl. No.: 13/491,467

(22) Filed: Jun. 7, 2012

(65) Prior Publication Data

US 2012/0312069 A1    Dec. 13, 2012

(30) Foreign Application Priority Data

Jun. 9, 2011    (EP) .................................... 11169340

(51) Int. Cl.
*G01G 23/01*    (2006.01)
(52) U.S. Cl.
CPC .................................... *G01G 23/012* (2013.01)
(58) Field of Classification Search
None
See application file for complete search history.

(56) References Cited

U.S. PATENT DOCUMENTS

| | | | |
|---|---|---|---|
| 2,672,755 A | | 3/1954 | Hohner |
| 4,099,587 A | | 7/1978 | Kaufmann |
| 4,343,373 A | * | 8/1982 | Stadler et al. ................... 177/50 |
| 4,932,487 A | * | 6/1990 | Melcher et al. ................. 177/50 |
| 6,194,672 B1 | | 2/2001 | Burkhard et al. |
| 7,429,705 B2 | | 9/2008 | Genoud et al. |
| 2008/0218303 A1 | | 9/2008 | Baltisberger et al. |
| 2011/0147099 A1 | | 6/2011 | Burkhard |

FOREIGN PATENT DOCUMENTS

| | | |
|---|---|---|
| CH | 661121 A5 | 6/1987 |
| DE | G8108831.0 U1 | 8/1981 |
| EP | 2434264 A1 | 3/2012 |
| JP | 2002-277316 A | 9/2002 |
| JP | 3761792 B2 | 1/2006 |

* cited by examiner

*Primary Examiner* — Robert R Raevis
(74) *Attorney, Agent, or Firm* — Standley Law Group LLP

(57) ABSTRACT

A force-transmitting mechanism of a gravimetric measuring instrument, with a stationary portion, and a load-receiving portion that is joined through a force-transmitting connection to a measurement transducer that is arranged on the stationary portion. A calibration weight may be coupled to the force-transmitting mechanism in such a way as to minimize the degree to which changes of the geometry can affect the force that the calibration weight exerts on the measurement transducer.

20 Claims, 9 Drawing Sheets

FORCE-TRANSMITTING MECHANISM WITH A CALIBRATION WEIGHT THAT CAN BE COUPLED AND UNCOUPLED

CROSS-REFERENCE TO RELATED APPLICATIONS

This application is entitled to benefit of a right of priority under 35 USC §119 from European patent application 11169340.4, filed 9 Jun. 2011, which is incorporated by reference as if fully recited herein.

TECHNICAL FIELD

The present invention concerns a force-transmitting mechanism for a gravimetric measuring instrument.

BACKGROUND

Weighing cells of the known state of the art operate according to different working principles based for example on strain gauges, on taut-string oscillators, or on electromagnetic force compensation (EMFC). Gravimetric measuring instruments with oscillating-string or EMFC weighing cells produce weighing results of a very high resolution.

In EMFC weighing cells, the weight of the load is transmitted either directly or by way of one or more force-transmitting levers to an electromechanical measurement transducer which generates an electrical signal representative of the weight of the weighing load. The signal is further processed by an electronic signal-processing arrangement and presented in an indicator display.

In their mechanical configuration, weighing cells that are based on the oscillating-string principle are largely analogous to EMFC weighing cells except that an oscillating-string transducer is used in place of an electromagnetic transducer. The weighing load causes a change of the tensile force in an oscillating string, whose change in frequency, in turn, represents a measure for the applied load. At the time of the measurement, the mechanical system of EMFC weighing cells is in an equilibrium position comparable to the equilibrium of a mechanical beam balance with counterweights. In contrast, the load-receiving portion of an oscillating-string weighing cell will slightly change its vertical position relative to the stationary portion, as the string is put in tension and thus elongated to a very small degree under the weighing load. Oscillating-string weighing cells are therefore also referred to as "small-deflection" force-measuring cells.

Both types of weighing cells are used for example in precision balances and analytical balances in the milligram range, or in microbalances in the microgram range, and need to be periodically recalibrated to maintain their capability of delivering measurement values within a prescribed tolerance range in accordance with manufacturers' specifications and regulatory requirements. These periodic calibrations are a corrective measure against factors that have an influence on the weighing cell, for example a change in the ambient temperature or barometric pressure.

The calibration is performed by periodically loading the load-receiving portion with a known weight. Based on the difference between the weight value that was determined during final inspection prior to delivery of the weighing cell and the value found in the current measurement, a correction value can be calculated by means of which the subsequent measurement results of the weighing cell can be corrected. In order to provide the most accurate calibration value possible, the calibration weight should equal the load capacity of the weighing cell. This can have the consequence that very large calibration weights will be needed.

The known state of the art includes a variety of gravimetric measuring instruments having calibration weights that are integrally incorporated.

A gravimetric measuring instrument of this type which operates according to the principle of electromagnetic force compensation and has a built-in rod-shaped calibration weight is disclosed in EP 0 955 530 B1. The rod-shaped calibration weight is arranged outside of the weighing cell and is placed on a calibration weight arm which is coupled to the load-receiving portion and serves as a force-magnifying lever. Due to this lever advantage, the mass of the calibration weight, and thus its dimensions, can be kept small. Since the calibration weight arm is always coupled to the load-receiving portion, it only performs the functions of leveraging and supporting the calibration weight during the calibration processes but is not a part of the calibration weight itself. Consequently, the calibration weight arm is part of a force-transmitting mechanism, more specifically of a lever arrangement for transmitting and leveraging the load to the measurement transducer, and remains connected to the load-receiving portion of the weighing cell also when the device operates in normal weighing mode.

As disclosed in CH 661 121 A5, the force-transmitting mechanism can also include a lever arrangement of more than one stage, wherein individual levers are suitably connected to each other by means of coupling elements, so that a force reduction is achieved between the load-receiving portion and the measurement transducer. One of the coupling elements includes holding means designed to receive a calibration weight.

A weighing cell with strain gauges which is disclosed in JP 3761792 B2 has a calibration weight with a ratio lever. A coupling element is arranged between the ratio lever and the load-receiving portion. By lifting the calibration weight and the coupling element, a load bearing which is formed on the coupling element is disengaged from a knife edge which is arranged on the load-receiving portion, whereby the ratio lever is uncoupled from the load-receiving portion.

All of the forgoing state-of-the-art solutions include calibration weight loading devices that are familiar to practitioners in the field of weighing technology.

The precise determination of the correction value is not only a function of the resolution of the measurement transducer, but also depends to a significant extent on how accurately the geometric proportions can be maintained. Even the smallest deviations of the calibration weight from its nominal position, for example on the calibration weight arm described in EP 0 955 530 B1, on the coupling member described in CH 661 121 A5, or the smallest changes in the position of the load bearing relative to the knife edge in JP 3761792 B2 cause the effective lever arm to be lengthened or shortened and thus introduce an error in the correction value. Consequently, the points of contact between the calibration weight and the calibration weight arm or between the knife edge and the load bearing are finished with the most exacting precision and thus at a high cost.

SUMMARY

The present invention therefore has the objective to create a force-transmitting mechanism for a gravimetric measuring instrument with a measurement transducer, wherein a calibration weight can be coupled to the force-transmitting mechanism in such a way as to minimize the degree to which changes of the geometry can affect the force that the calibration weight exerts on the measurement transducer.

This task is solved by the force-transmitting mechanism of the present invention with a calibration weight lever, as well as by a gravimetric measuring instrument that comprises the force-transmitting mechanism according to the invention.

A force-transmitting mechanism of a gravimetric measuring instrument comprises a stationary portion and a load-receiving portion. The load-receiving portion is coupled through a force-transmitting connection, either directly or by way of at least one coupling element and at least one lever, to a measurement transducer which is arranged on the stationary portion. The force-transmitting mechanism according to the invention further comprises a coupling mechanism and a calibration lever with a fulcrum. The calibration lever has a first and a second calibration lever arm, wherein the coupling mechanism is arranged between the calibration lever and the at least one lever. The coupling mechanism is divided into a first coupling part and a second coupling part which are oriented relative to each other in such a way that only a tractive or a compressive force can be transmitted between them. The fulcrum of the calibration lever is supported on the load-receiving portion.

The two-part arrangement of the coupling mechanism makes it possible to couple the calibration lever including the integrally connected calibration weight to the load-receiving portion through force-transmitting engagement, or to totally uncouple the calibration lever from the load-receiving portion. The coupling mechanism serves in particular to transmit the calibration force by transferring a tractive or compressive force. When pushed in the opposite direction, the two parts of the coupling mechanism separate from each other, so that no force can be transmitted between them. Depending on the actual configuration of the two parts of the coupling mechanism, it is also possible that the separation takes place only when one part of the coupling mechanism is displaced by a certain amount relative to the other part, in which case this displacement alone should be considered as meeting the spirit of the invention. In the uncoupled state, the two coupling parts are not in contact with each other, and no force can therefore be transmitted between them.

Arranging the fulcrum of the calibration lever on the load-receiving portion allows for a compact design of the force-transmitting mechanism.

In weighing cells with electromagnetic force compensation, since the measurements are taken in the balanced state, the bending moments in the flexure pivots of the force-transmitting mechanism are approximately zero. The calibration lever, specifically its fulcrum flexure, is preferably designed accordingly, so that no bending moment occurs in the fulcrum flexure during the calibration process.

In one exemplary embodiment, the coupling mechanism is configured as a parallel-guided coupling mechanism whose first coupling part comprises a first and a second parallel element that are arranged parallel to each other and through which the first, parallel-guided coupling part is tied either to the calibration lever or to the load-receiving portion, so that relative movements in the transverse direction which occur in the transmission of a force through the parallel-guided coupling mechanism are absorbed by the first and second parallel elements. Different versions of a parallel-guided coupling mechanism are described for example in the European patent application EP 2 434 264 A1, which is hereby incorporated by reference in the present disclosure.

Thus, by means of the parallel-guided coupling mechanism, the calibration weight can be coupled to the force-transmitting mechanism, whereby the latter can be calibrated.

In the process of coupling the calibration weight into engagement with the force-transmitting mechanism it is possible that due to a difference in the swivel radii, transverse displacements will occur between the coupling point of the calibration weight and the distance to the nearest pivot points. These displacements can be compensated in particular by the parallel-guided coupling mechanism, specifically by the parallel-guided coupling part of the coupling mechanism.

The parallel-guided coupling mechanism in this arrangement is configured in such a way that only compressive or tensile forces can be transmitted, which are directed along the central lengthwise axis of the parallel-guided coupling mechanism.

In addition, the two parallel elements of the parallel-guided coupling part of the coupling mechanism are configured to be on the one hand as flexible as possible so that deflections will cause only small bending moments, and on the other hand to still be sufficiently stiff that the parts of the coupling mechanism will not be deflected under their own weight or as a result of inertial and dynamic forces while the force-transmitting mechanism is working in normal operating mode. The two parallel elements are parallel to each other and to the direction of the force that can be transmitted through the parallel-guided coupling mechanism. The two parallel elements have the purpose to absorb transverse relative displacements at the coupling of the calibration weight, even if they are relatively small, which can occur when a force is transmitted through the coupling while a calibration measurement value is being determined.

What has been said here also applies with good approximation to oscillating-string weighing cells because the placing of a load on the load-receiving portion causes only a slight elongation of the string, and the bending moments occurring in the flexure pivots of the force-transmitting mechanism are therefore only of limited magnitude. Furthermore, coupling mechanism of this kind can also be used in strain gauge load cells.

According to a further embodiment, the coupling mechanism is configured as a unidirectional coupling mechanism which is likewise divided into a first and a second coupling part. The first coupling part includes a first flexure pivot and the second coupling part includes a second flexure pivot, wherein one of the coupling parts is tied through its respective flexure pivot to the load-receiving portion, while the other coupling part is tied to the calibration lever. The flexure pivots of the two coupling parts are configured to be on the one hand as flexible as possible so that deflections will cause only small bending moments and on the other hand to still be able to perform their generic function, i.e. to transmit tensile or compressive forces in the direction of their central longitudinal axis. Furthermore, the flexure pivots must be designed so that their destabilizing tendency to bend under compression will not cause the coupling parts to be deflected sideways under their own weight or as a result of inertial and dynamic forces while the force-transmitting mechanism is working in normal operating mode. The two coupling parts are lined up with each other so that, due to the unidirectional coupling mechanism being split into two parts, the force that can be transmitted from the second flexure pivot to the first flexure pivot is a purely tensile force or a purely compressive force.

Preferably, the central longitudinal axes of the first and the second flexure pivot coincide with each other, so that no destabilizing moments occur within the unidirectional coupling mechanism. However, a minor parallel offset between the two central longitudinal axes can be tolerated if at least one contact zone between the first and the second coupling part is designed with an inherent stability against a transverse deflection of the two coupling parts. In the transmission of tensile forces, this stability occurs as a natural property of objects under traction. In contrast, if compressive forces are being transmitted, there are only certain specific design configurations available to make the unidirectional coupling mechanism inherently stable. Different embodiments of a unidirectional coupling mechanism are described for example in EP 2 336 736 A1, which is hereby incorporated by reference in the present application.

In contrast to the existing state of the art where the force is transmitted through the supporting contact points of the calibration weight, the calibration weight force according to the concept of the invention is transmitted through the coupling mechanism. In a parallel-guided coupling mechanism the force is transmitted through the parallel elements, and in a unidirectional coupling mechanism through the flexure pivots. Consequently, the critical geometric dimensions always remain unchanged, because minute position shifts between the first and the second coupling part are being absorbed rather than occurring at the actual points of force introduction that are defined by the unchangeable positions of the parallel elements or the flexure pivots.

In one embodiment, the first coupling part and the second coupling part each have at least one contact location for the transmission of compressive forces, with the respective contact points of the first and the second coupling part being oriented so that they face each other. The force-transmitting contact locations can be designed so that the first and the second coupling part will center themselves relative to each other in the calibration process.

If tractive forces are to be transmitted, one of the two coupling parts can include a first traction element, for example with a convex projection, while the other coupling part includes a second traction element, for example with a concave bearing, wherein the first and the second traction element reach into each other, the projection is aligned with the concave bearing, and tractive forces are transmitted when the projection and the bearing are in contact with each other.

The force-transmitting mechanism can also include a parallel-guiding mechanism which ties the load-receiving portion to the stationary portion by means of at least one upper parallel guide and at least one lower parallel guide which, in the operating position, guide the load-receiving portion in vertical movement.

The calibration weight can be coupled to a calibration weight loading device which is powered by a drive source and which causes the calibration weight to be coupled to, and uncoupled from, the lever system of the force-transmitting mechanism by lifting or lowering the calibration weight.

According to one exemplary embodiment, the calibration weight loading device is arranged on the load-receiving portion, which allows for a compact configuration of the force-transmitting mechanism.

The calibration weight loading device can be supplied with current for example through the parallel guides of the force-transmitting mechanism. In addition, it is also possible to transmit electrical signals through the parallel guides of the force-transmitting mechanism, allowing for example also the transfer of control commands or the retrieval of data from the calibration weight loading device. This concept is of particular advantage when the calibration weight loading device is arranged on the load-receiving portion, because such a configuration is particularly effective in screening out electromagnetic interference of the drive source.

The transmission of current and/or electrical signals from the stationary portion to the load-receiving portion can also be realized with thin wire leads. The wires should be very thin so as not to impede the function of the force-transmitting mechanism.

The calibration weight loading device can be actuated for example by a self-inhibiting eccentric. Further design options for the calibration weight loading device include a drive source that is external to the force-transmitting mechanism and is engaged only for the coupling and uncoupling of the calibration weight.

The force-transmitting mechanism can consist of a plurality of individual components which are assembled into a unit by means of connector elements. However, several of these components can also be integrally connected to each other. Preferably, at least the load-receiving portion, the stationary portion, the calibration lever and the coupling mechanism are monolithically connected to each other.

As has already been mentioned previously, the force-transmitting mechanism according to the invention together with a measurement transducer and a calibration weight can be used as a weighing cell in a gravimetric measuring instrument. A gravimetric measuring instrument is normally calibrated in such a way that the weight force of the calibration weight, after it has been transmitted by the force-transmitting mechanism, will act on the measurement transducer in the same direction as a force applied to the load-receiving portion. Consequently, the load of a calibration force is applied to the measurement transducer in the same way as a weighing load during operation in normal weighing mode. In oscillating-string weighing cells, the measurement transducer can in most cases only accept a load acting in the same direction as a weighing load. Thus, the inventive concept of the foregoing description is equally applicable for oscillating-string weighing cells and EMFC weighing cells.

In a further embodiment, the calibration weight can be arranged between the pivot joint and the coupling mechanism, so that the weight force generated by the calibration weight will act on the force measurement transducer in the opposite direction of a force resulting from a load placed on the load-receiving portion. This configuration is suitable in particular for EMFC weighing cells whose measurement transducer operates according to the push-pull principle as described in detail in US 2008/0218303 A1. With this design, the calibration weight can be used as a compensation weight to expand the load range of the weighing cell or to compensate for a preload acting on the load receiver. A weighing cell of this configuration could for example be used with the calibration weight in the uncoupled position to weigh loads in the 0 to 100 gram range, and to expand the weighing range for loads between 100 and 200 grams by coupling the calibration weight to the force-transmitting mechanism, as the weight force of the calibration weight counteracts the load acting on the load-receiving portion.

The calibration weight is normally made of a corrosion-resistant material with a uniform density of $\rho=8.0$ kg/dm3. However, the calibration weight can also be made in part of the same material as the force-transmitting mechanism and be supplemented with an auxiliary mass of higher density. The accuracy of the calibration value can further be increased by using a pressure sensor for the measurement of the ambient barometric pressure of the gravimetric measuring instrument. Its measurement value can be used to calculate a correction for the air buoyancy of the calibration weight, as the buoyant force of the air displaced by the calibration weight acts in the opposite direction of the weight force of the calibration weight.

BRIEF DESCRIPTION OF THE DRAWINGS

Various exemplary embodiments of force-transmitting mechanisms according to the invention and their use in a gravimetric measuring instrument are described in more detail below with the help of the attached drawings, wherein like reference numerals across the several views refer to identical or equivalent features, and wherein.

DETAILED DESCRIPTION OF EXEMPLARY EMBODIMENT(S)

Figure 1:
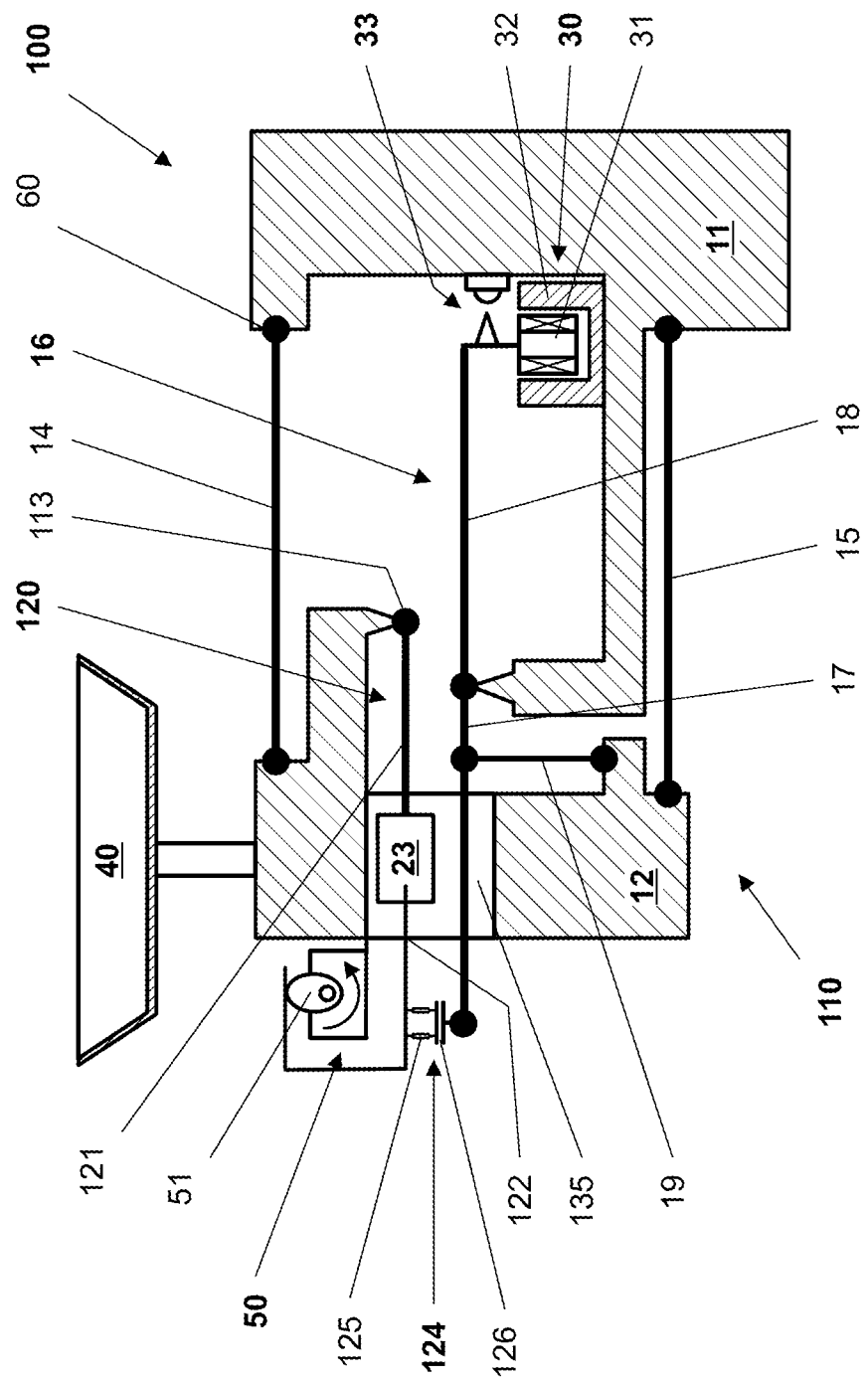
FIG. 1 is a side elevation view that schematically represents a weighing cell used in conjunction with a first exemplary embodiment of a force-transmitting mechanism.

FIG. 1 schematically illustrates an exemplary weighing cell 100 with an exemplary embodiment of a force-transmitting mechanism 110. The force-transmitting mechanism 110 includes a stationary portion 11 and a load-receiving portion 12. The load-receiving portion 12 is tied to the stationary portion 11 and guided in parallel movement by means of a first parallel-guiding member 14 and a second parallel-guiding member 15. A calibration lever 120 is pivotally supported on the load-receiving portion 12 by way of a fulcrum 113. The fulcrum 113 as well as all of the pivoting joints of the force-transmitting mechanism 110 are represented as large circular dots and can be realized through any conventional design. These pivoting joints are normally configured as narrow and flexible material connections.

Connected to the load-receiving portion 12 is a load receiver 40 in the form of a weighing pan. Further, mounted rigidly on the stationary portion 11 is a measurement transducer 30 with the capability of producing a weighing signal representative of a force. The measurement transducer 30 in this illustration includes a coil 31 and a magnet system 32 with a permanent magnet, as well as a position sensor 33. The magnet system 32 is rigidly connected to the stationary portion 11, and the force that is to be measured acts on the coil 31 which is arranged in a contact-free floating position inside the magnet system 32. The force acting on the coil 31 causes it to move in relation to the magnet system 32, and this displacement is detected by the position sensor 33. The signal produced by the position sensor 33 is sent to an electronic control circuit (not shown in the drawing) which continuously regulates a current flowing through the coil 31, so as to restore the original position of the coil 31 in relation to the magnet system 32 regardless of the applied force. The current flowing through the coil 31 is measured, and the resultant raw measurement signals are processed by the electronics of the balance to produce a measurement value which is sent to an indicator and displayed. Of course, the measurement transducer 30 shown here can also be replaced by other measurement transducers, for example, oscillating-string transducers, inductive and capacitative measurement transducers, and strain-gauge-based transducers and the like.

As the measurement transducer 30 can only generate a limited compensating force to balance the force acting on the load-receiving portion 14, a lever arrangement with one or more stages is used in many cases for the reduction of the force that is to be measured. The lever arrangement is interposed between the load-receiving portion 12 and the measurement transducer 30 to perform its force-transmitting function. The lever arrangement illustrated in FIG. 1 has a lever 16 that is pivotally supported on the stationary portion 11 and whose short lever arm 17 is connected by way of a first coupling element 19 to the load-receiving portion 12. The long lever arm 18 of the lever 16 is connected to the coil 31.

The force-transmitting mechanism 110 further includes a calibration lever, which is pivotally mounted on the load-receiving portion 12 through a fulcrum 113 and whose first calibration lever arm 121 is rigidly connected to a calibration weight 23. The calibration weight 23 is in this case arranged in a pass-through opening 135 of the load-receiving portion 12. The function of transmitting the weight force of the calibration weight 23 is performed in this embodiment by a parallel-guided coupling mechanism 124 which includes a first, parallel-guided coupling part 125 and a second, fixed coupling part 126. The first coupling part 125 is connected to the second calibration lever arm 122 by means of two parallel elements which in this case include flexure pivots, and the fixed coupling part 126 is connected to the lever arm 17, so that the parallel-guided coupling mechanism 124 is arranged between the lever 16 and the second calibration lever arm 122.

As shown in FIG. 1, a calibration weight loading device 50 is solidly attached to the load-receiving portion 12 and, depending on the position of its cam disk 51, either holds the calibration weight 23 in a supported position on the load-receiving portion 12 or releases the calibration weight 23. The calibration weight loading device shown here preferably includes a self-inhibiting eccentric as indicated here by the cam disk 51. In the supported state, the first, parallel-guided coupling part 125 and the second, fixed coupling part 126 are disconnected from each other. In the released state of the calibration weight loading device 50, the two coupling parts 125, 126 are lying against each other, so that the weight force of the calibration weight 23 is transmitted through the lever arms 17, 18 to the coil 31 of the measurement transducer 30. In the embodiment of FIG. 1, the calibration weight loading device 50 is arranged on the outside of the load-receiving portion 12. This configuration requires on the one hand good shielding of magnetic fields while allowing on the other hand a more flexible design of the calibration weight loading device 50, as the latter can be realized, e.g., as an eccentric with a cam disk 50 or also connected to the calibration weight 23 through a suitable coupling, so that the calibration weight loading device 50 can be arranged, as shown in FIG. 1, essentially outside of the weighing cell 100, and in particular outside of the force-transmitting mechanism 110.

As is clearly evident from the schematic illustration, the parallel-guided coupling mechanism 124 can only transmit compressive forces, because in the released state of the calibration weight 23 the second, fixed coupling part 126 is pushed against the first, parallel-guided coupling part 125, acting in opposition to the reactive force generated by the measurement transducer 30.

The parallel-guided coupling mechanism 124 serves to absorb transverse forces which would accompany a displacement of the coupling parts without the parallel-guiding feature, because in that case a relative horizontal displacement could give rise to mutually opposed reactive forces in the lever fulcrums because of the difference in the swivel radii. These transverse forces are absorbed by the parallel-guided coupling mechanism 124 and in particular by the parallel-guided coupling part 125.

Figure 2:
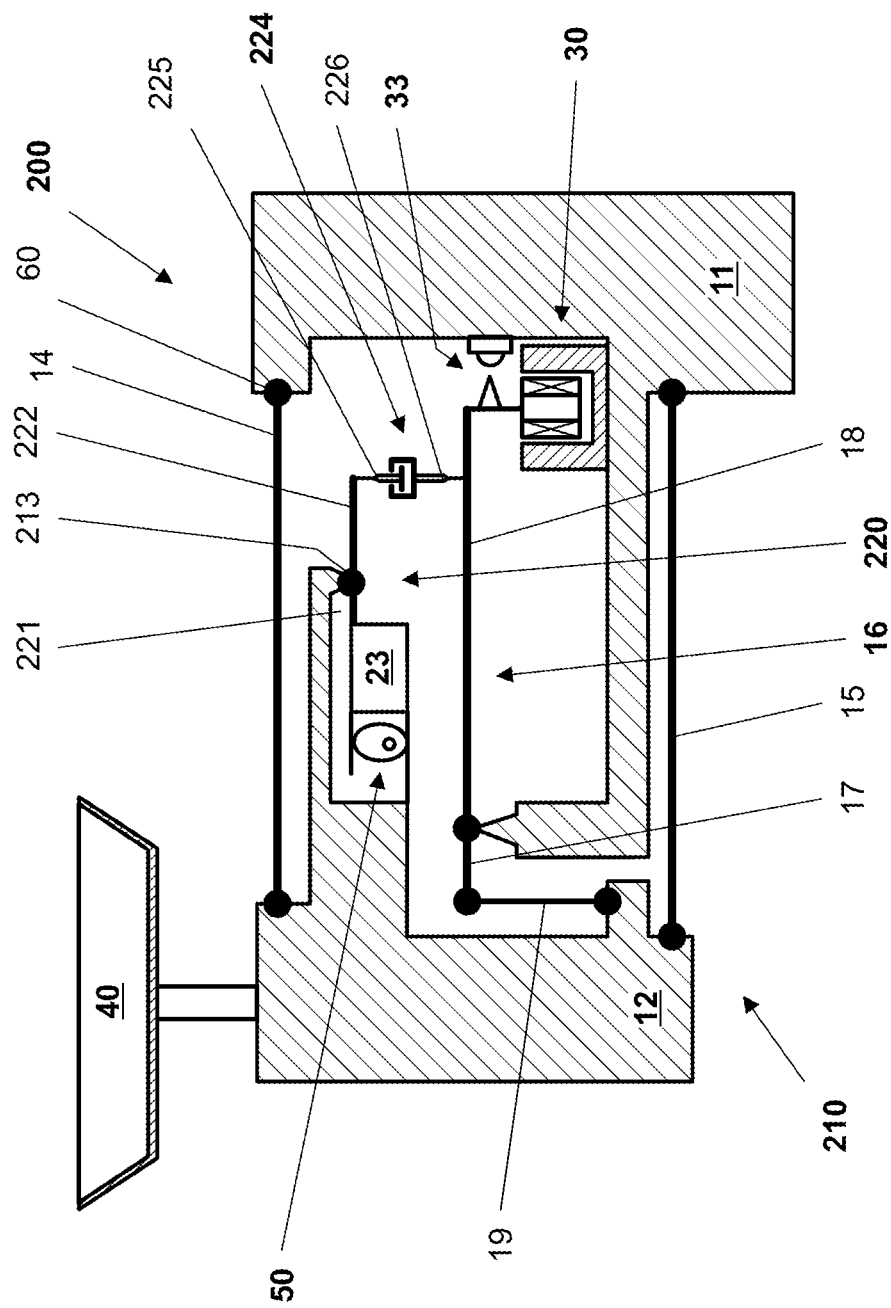
FIG. 2 is a side elevation view that schematically represents a weighing cell used in conjunction with a second exemplary embodiment of a force-transmitting mechanism.
Figure 7:
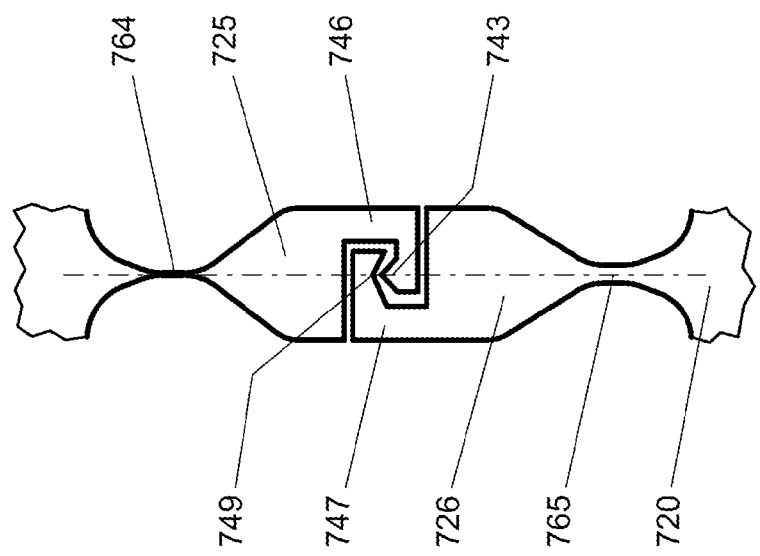
FIG. 7 illustrates an exemplary embodiment of a unidirectional coupling mechanism capable of transmitting only a tractive force.

FIG. 2 schematically illustrates an exemplary weighing cell 200 in a side elevation drawing, with a further embodiment of the force-transmitting mechanism 210. A unidirectional coupling mechanism 224, which is shown in detail in FIG. 7, is designed to transmit a tractive force, with the calibration weight 23 in this embodiment being connected to the load-receiving portion 12 through a lever fulcrum 213. The function of coupling the calibration weight 23, i.e. moving the calibration weight 23 between the coupled and uncoupled state, can be performed by a calibration weight loading device 50 with a cam disk as shown previously in FIG. 1, or for example by a drive source that could be coupled from the outside. The calibration weight loading device can be supplied with current and/or electrical signals, for example control commands, through the parallel guides 14, 15 of the force-transmitting mechanism 210. In practice, this could be realized for example by laying conductive tracks (not shown in the drawing) directly onto the surface of the parallel guides 14, 15, so that the proper functioning of the force-transmitting mechanism 210 would not be affected. As a further possibility, the current and/or signals could also be transmitted through thin wires that are arranged between the load-receiving portion 12 and the stationary portion 11.

The calibration lever 220 in FIG. 2 has a first calibration lever arm 221 and a second calibration lever arm 222, with the first calibration lever arm 221 extending from the calibration weight 23 to the fulcrum 213 and the second calibration lever arm 222 extending between the fulcrum 213 and the first coupling part 225 of the unidirectional coupling mechanism 224.

The unidirectional coupling mechanism 224 has a first and a second coupling part 225, 226 which in their disengaged state have no contact to each other. As soon as the calibration weight 23 is released and a tractive force needs to be transmitted through the two coupling parts 225, 226 to the long lever arm 18 of the lever 16, the first coupling part 225 undergoes a slight relative displacement and enters into contact with the second coupling part 226.

Figure 3:
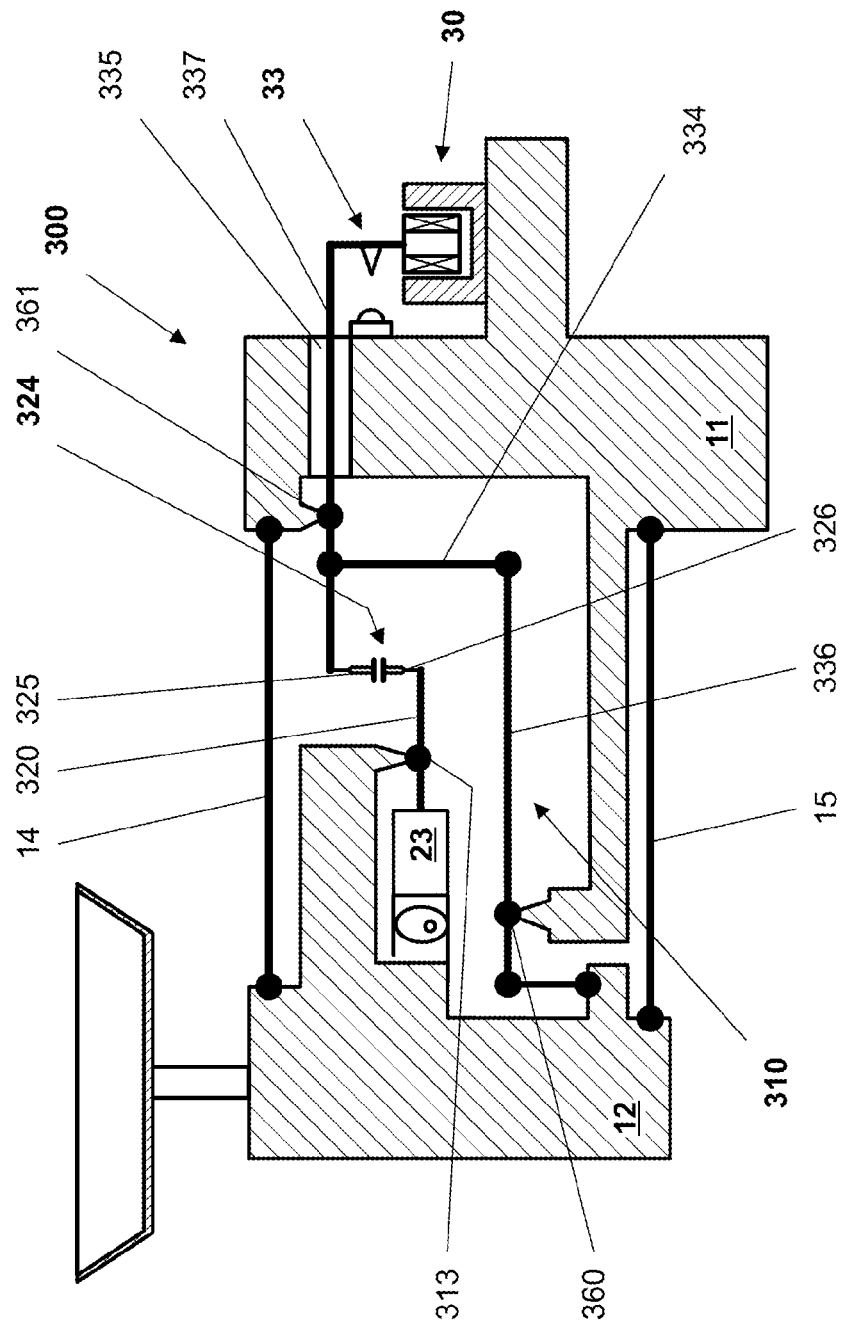
FIG. 3 is a side elevation view that schematically represents a weighing cell used in conjunction with a third exemplary embodiment of a force-transmitting mechanism.

FIG. 3 schematically illustrates an exemplary weighing cell 300 in a side elevation drawing, with a further embodiment of the force-transmitting mechanism 310 which includes a lever system with two levers 336, 337 between the load-receiving portion 12 and the measurement transducer 30 for the reduction of the force acting on the load-receiving portion 12. Some of the elements shown in FIG. 3 are again analogous to elements in the preceding drawings and therefore carry the same reference symbols or are not mentioned again in the description. The first lever 336 is linked by a force-transmitting coupling element 334 to the second lever 337. A unidirectional coupling mechanism 324 designed to transmit only compressive forces is arranged between the coupling element 334 and a calibration lever 320 which is pivotally connected to the load-receiving portion 12. The first coupling part 325 of the coupling mechanism 324 is connected to the second lever 335, and the second coupling part 326 is connected to the calibration lever 320.

In order to facilitate an exchange of the measurement transducer 30, the stationary portion 11 has a passage opening 335 through which the second lever 337 reaches, so that the measurement transducer 30 can be arranged on the side of the stationary portion 11 that faces away from the parallel guides 14, 15.

Figure 4:
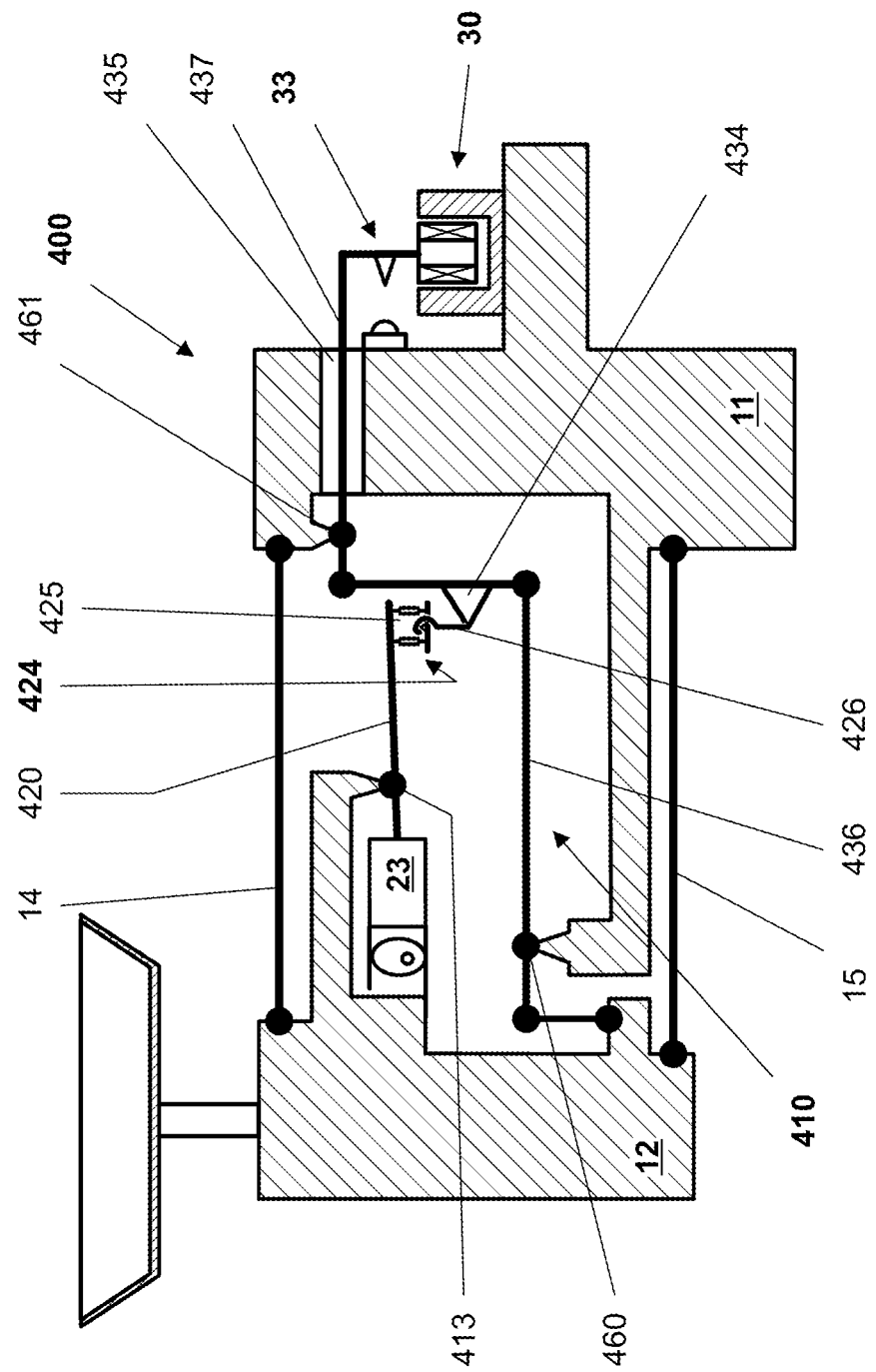
FIG. 4 is a side elevation view that schematically represents a weighing cell used in conjunction with a fourth exemplary embodiment of a force-transmitting mechanism.

FIG. 4 schematically illustrates an exemplary weighing cell 400 in a side elevation drawing, with a further embodiment of the force-transmitting mechanism 410 which, like FIG. 3, includes a lever system with two levers 436, 437 between the load-receiving portion 12 and the measurement transducer 30 for the reduction of the force acting on the load-receiving portion 12. Some of the elements shown in FIG. 4 are again analogous to elements in the preceding drawings and therefore carry the same reference symbols or are not mentioned again in the description. The first lever 436 is linked by a force-transmitting coupling element 434 to the second lever 437. A parallel-guided coupling mechanism 424 designed to transmit only tractive forces is arranged between the coupling element 434 and a calibration lever 420 which is pivotally connected to the load-receiving portion 12. The fixed coupling part 426 of the parallel-guided coupling mechanism 424 is connected to the coupling element 434, and the parallel-guided coupling part 425 is connected to the calibration lever 420.

The parallel-guided coupling mechanism 424 includes a parallel-guided coupling part 425 and a fixed coupling part 426 which in the load-free state reach into each other without coming into contact. As soon as the calibration weight 23 is released, which will cause a tractive force to be transmitted from the fixed coupling part 426 to the parallel-guided coupling part 425 and thus to the lever 436, the fixed coupling part 426 will settle into engagement with the parallel-guided coupling part 425 after the two parts have moved relative to each other along a defined short displacement path.

In the illustrated embodiment, the offset between the respective lines of action of the forces in the coupling element 434 and in the laterally connected parallel-guided coupling mechanism 424 introduces a torque which gives rise to reactive forces in the fulcra 460, 461 of the levers 436, 437. Solutions of the kind described in connection with FIG. 5 in which the two lines of action coincide with each other are therefore preferable. Furthermore, this torque can be compensated with an appropriate choice of the coupling mechanism as shown for example in FIG. 3.

In the embodiment of FIG. 4, the tractive force transmitted from the calibration weight 23 to the lever 436 has the same effect as a force to be measured which has been generated by a load placed on the load receiver 40.

Figure 5:
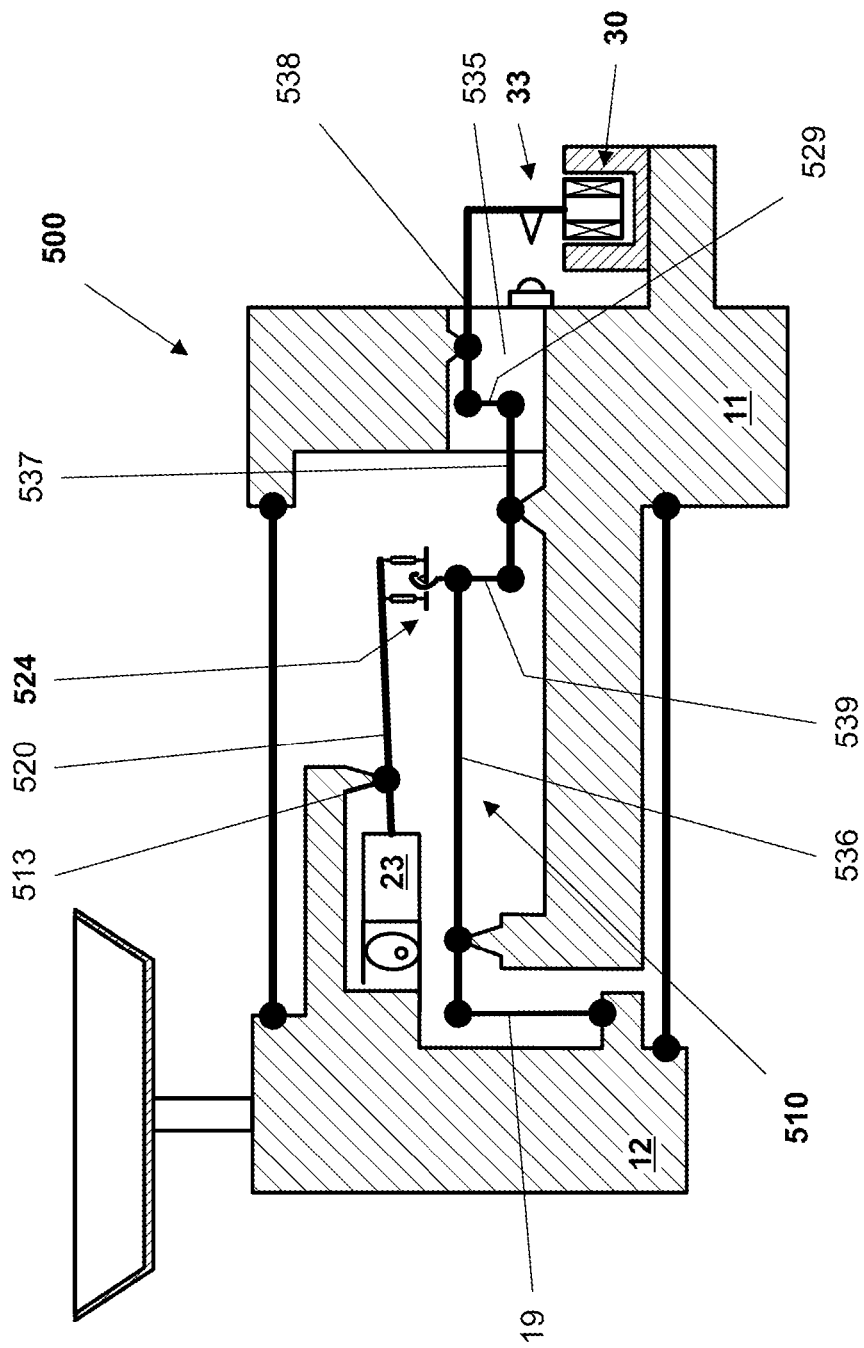
FIG. 5 is a side elevation view that schematically represents a weighing cell used in conjunction with a fifth exemplary embodiment of a force-transmitting mechanism.

FIG. 5 schematically illustrates an exemplary weighing cell 500 in a side elevation drawing, with a further embodiment of the force-transmitting mechanism 510. The latter includes a lever system with three levers 536, 537, 538 between the load-receiving portion 12 and the measurement transducer 30 for the reduction of the force acting on the load-receiving portion 12. As illustrated already in FIGS. 3 and 4 and described above, the first lever 536 is linked by a second coupling element 539 to the second lever 537, and the second lever 537 is linked by a third coupling element 529 to the third lever 538 to establish a force-transmitting connection. A parallel-guided coupling mechanism 524 designed to transmit only tractive forces is arranged between the lever system and a calibration lever 520. The force is introduced at the second coupling element 539 that connects the first lever 536 to the second lever 537, wherein the parallel-guided coupling mechanism 524 is not arranged in a parallel configuration as in FIG. 4, but rather in series with the second coupling element 539. The serial arrangement prevents a torque from being exerted on the second coupling element 539 during the calibration process, as could be the case with the coupling element 434 shown in FIG. 4.

Figure 6:
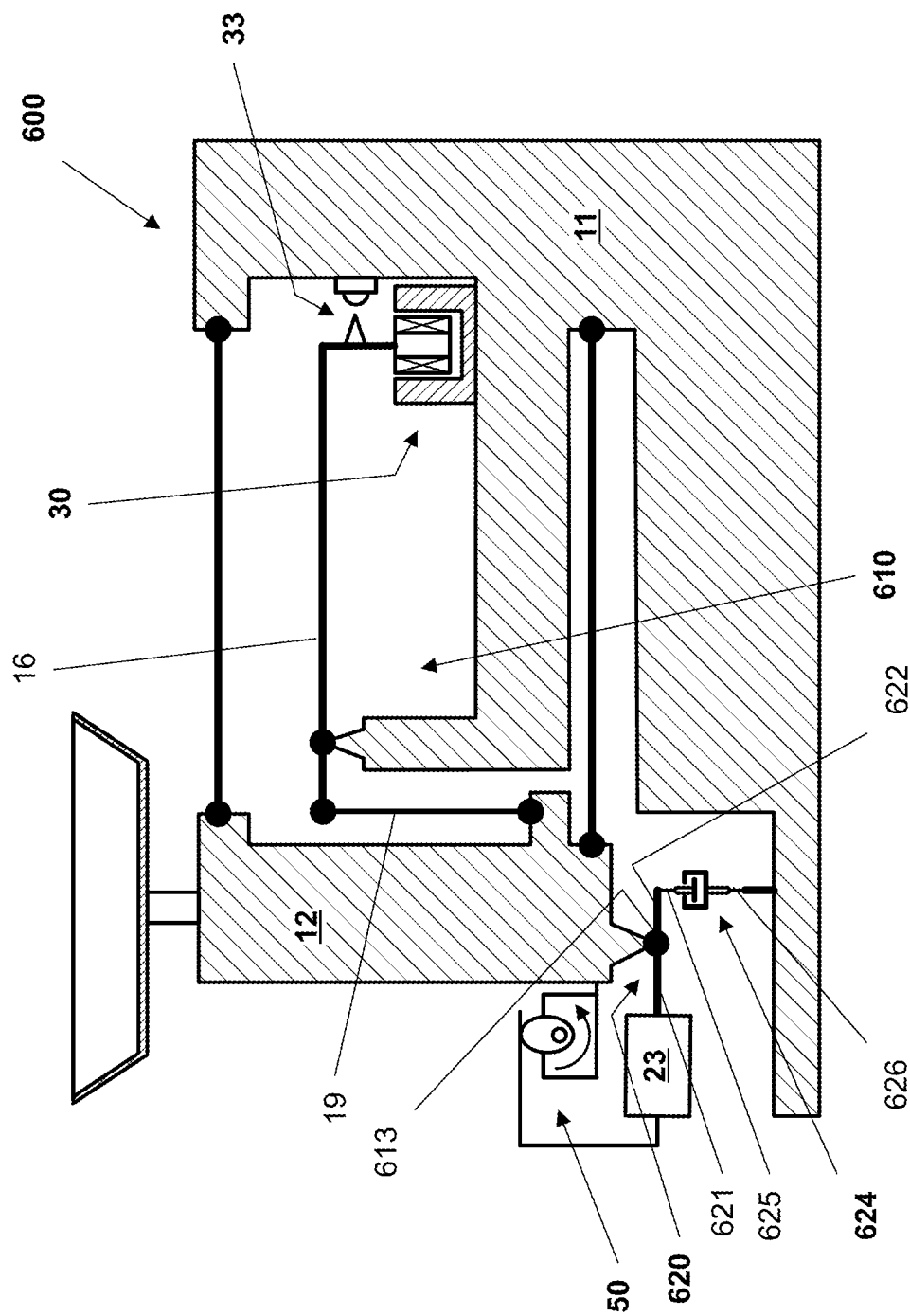
FIG. 6 is a side elevation view that schematically represents a weighing cell used in conjunction with a sixth exemplary embodiment of a force-transmitting mechanism.

Of course, the calibration weight 23 can also be designed to act more directly on the load-receiving portion 12, as illustrated in FIG. 6, which shows a side elevation an exemplary weighing cell 600 with a further exemplary embodiment of the force-transmitting mechanism 610. Except for the calibration lever 620 and the unidirectional coupling mechanism 624, all of the elements shown are analogous to those in FIG. 1 and will therefore not be covered again in the following description. The lever arrangement includes a lever 16 which is arranged between the load-receiving portion 12 and the measurement transducer 30. The calibration lever 620 with a calibration weight 23, which is pivotally connected to the stationary portion 11 through the unidirectional coupling mechanism 624, is located (in reference to the operating position of the weighing cell 600) below the load-receiving portion 12. The calibration lever 620 is supported by a fulcrum pivot 613 on the load-receiving portion 12.

The force transfer from the calibration lever 620 to the load-receiving portion 12 occurs by way of the unidirectional coupling mechanism 624 which is designed to transmit tractive forces. In this embodiment, the first coupling part 625 is connected to the calibration lever 620 and the second coupling part 626 to the load-receiving portion 12. The shorter the second lever arm 622 of the calibration lever 620 in proportion to the first calibration lever arm 621, the larger the calibration force that is transmitted through the unidirectional coupling mechanism 624 to the load-receiving portion 12.

Of course, the arrangement in the example of FIG. 6 could also be used in combination with a system where the force to be measured is introduced directly, as disclosed for example in CH 593 481 A5 or in EP 1 726 926 A1. The calibration weight 23 would in this case be coupled through the coupling mechanism 624 directly to the measurement system, as indicated in FIG. 6 by the fact that the fulcrum pivot 613 is attached to the load-receiving portion 12.

FIGS. 7 to 12 show different embodiments of a parallel-guided coupling mechanism which can be arranged in a force-transmitting mechanism of a weighing cell as illustrated in FIGS. 1 to 6. The coupling mechanism can be configured as a parallel-guided or unidirectional coupling mechanism, either for the transmission of a tractive force or for the transmission of a compressive force. A coupling mechanism includes a first and a second coupling part which can be brought into contacting engagement with each other in order to transmit a force. In accordance with the invention, the coupling mechanism is arranged between the calibration lever and the lever system of the force-transmitting mechanism.

FIG. 7 illustrates an embodiment of a unidirectional coupling mechanism designed to transmit only tractive forces, in its operating position. A first coupling part 725 is connected through a first flexure pivot 764 to the load-receiving portion or the lever system (indicated only fragmentarily) of a force-transmitting mechanism. Due to the hanging position of the first coupling part 725, the first flexure pivot 764 can have a very slender shape. The first coupling part 725 further includes a first traction element 746.

The second coupling part 726 is connected to the calibration lever 720 (indicated only fragmentarily) through a second flexure pivot 765. For the second flexure pivot 765 to remain in its upstanding position, it needs to have a stiffer elastic constant and therefore more massive proportions than the first flexure pivot 764. If it is appropriately designed for the operating conditions of the force-transmitting mechanism, the second coupling part 726 will not be deflected under its own weight or as a result of inertial and dynamic forces that occur during operation.

The second coupling part 726 includes a second traction element 747. When there is a force to be transmitted from the second flexure pivot 765 to the first flexure pivot 764, the first traction element 746, after a slight relative displacement, enters into engagement with the second traction element 747. To provide an even more reliable transfer of tractive forces, the first traction element 746 can have a projection 743 and the second traction element 747 can have a receiving seat 749. As soon as the first traction element 746 and the second traction element 747 are settled into mutual engagement the projection 743 and the receiving seat 749, due to the way in which they are shaped, are in self-centering alignment with each other, and the projection 743 is in force-transmitting contact with the receiving seat 749.

Figure 8:
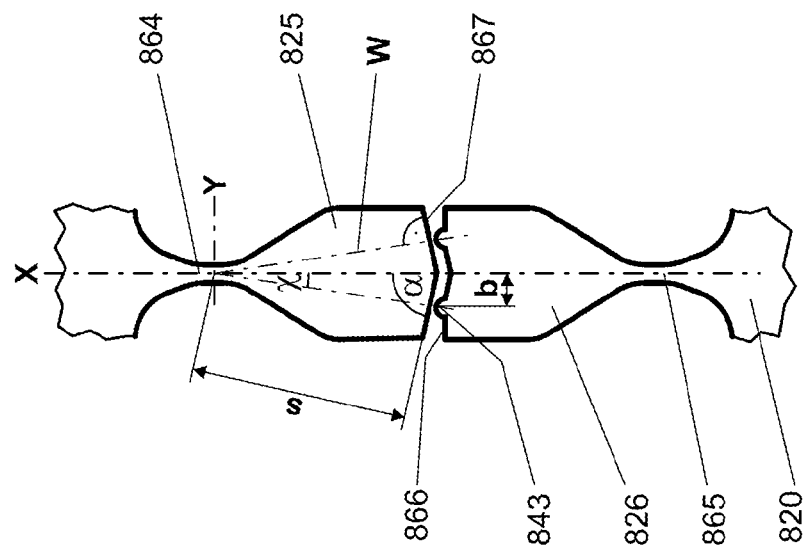
FIG. 8 illustrates an exemplary embodiment of a unidirectional coupling mechanism capable of transmitting only a compressive force.

FIG. 8 illustrates a possible design of a unidirectional coupling mechanism capable of transmitting only compressive forces, in its operating position. A first coupling part 825 is connected by means of a first flexure pivot 864 to the fragmentarily indicated load-receiving portion or to the lever system of a force-transmitting mechanism.

A second coupling part 826 is connected to the fragmentarily represented calibration lever 820 by way of a second flexure pivot 865. Given that the forces transmitted in the calibration process are compressive forces and that the two parts 825, 826 of the coupling mechanism can never be allowed to buckle under a load, the unidirectional coupling mechanism needs to be inherently stable. The second coupling part 826 has a surface 866 facing against the first coupling part 825 with two projections 843 rising from the surface 866, which are arranged in mirror symmetry relative to the central longitudinal axis X of the second flexure pivot 865. Furthermore, the first coupling part 825 has two contact areas 867 facing towards the second coupling part 826, so that each of the two projections 843 can seat itself against one of the contact areas 867. Accordingly, this design provides for two contact locations which lie in a plane that is orthogonal to the central longitudinal axes X of the two flexure pivots 864, 865 and which lend an inherent stability to the unidirectional coupling element to perform its function of transmitting a compressive force.

As illustrated in FIG. 8, this configuration allows the first coupling part 825 and the second coupling part 826 to be aligned with each other in the calibration process. Displacements orthogonal to the central longitudinal axes X of the flexure pivots 864, 865 can thus be prevented. To perform their alignment function, the two contact areas 867 of the first coupling part 825 are inclined at an obtuse angle relative to each other. However, to meet the requirement of inherent stability of the unidirectional coupling mechanism, the slope angle of the contact areas 867 has to be within certain limits.

The limits for the slope angle of the contact areas 867 depend on the geometry of the unidirectional coupling mechanism, wherein the critical factor is the angle $\alpha$ enclosed between one of the contact surface areas 867 and the central longitudinal axis X of the flexure pivot 864. The defining parameters are the perpendicular distance b of a contact point, i.e. a projection 843, from the central longitudinal axis X of the flexure pivot, and the distance s between a contact point on the contact surface areas 867 and the pivoting axis Y of the first flexure pivot 864.

$$x=\arcsin(b/s)$$

$$\alpha=(90°-x)=\arccos(b/s)$$

The angle α has to be within the limits:

$$90° \geq \alpha \geq \arccos(b/s)$$

According to the definition of the angle α given above, the condition for inherent stability is met if the lines of action W of the forces transmitted through the contact points are not intersecting each other within the first coupling part 825. The limiting case α=arcos (b/s) is illustrated in FIG. 8.

Figure 9:
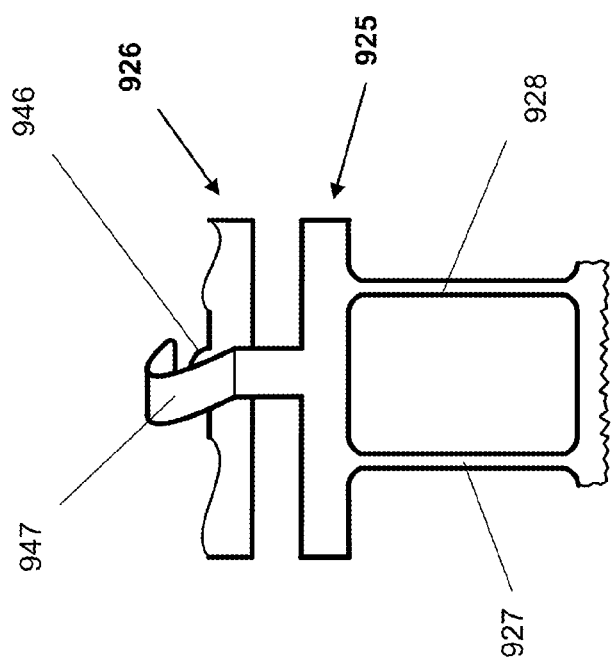
FIG. 9 illustrates an exemplary embodiment of a parallel-guided coupling mechanism capable of transmitting only a tractive force.

FIG. 9 illustrates an exemplary embodiment of a parallel-guided coupling mechanism, wherein a first, parallel-guided coupling part 925 includes a second traction element 947 with a bearing and a second, fixed coupling part 926 includes a first traction element 946 with a projection, wherein the coupling parts 925, 926 can enter into mutual engagement in order to transmit a force. The parallel-guided coupling part 925 in this drawing includes two parallel elements 927, 928 configured as leaf springs.

Figure 10:
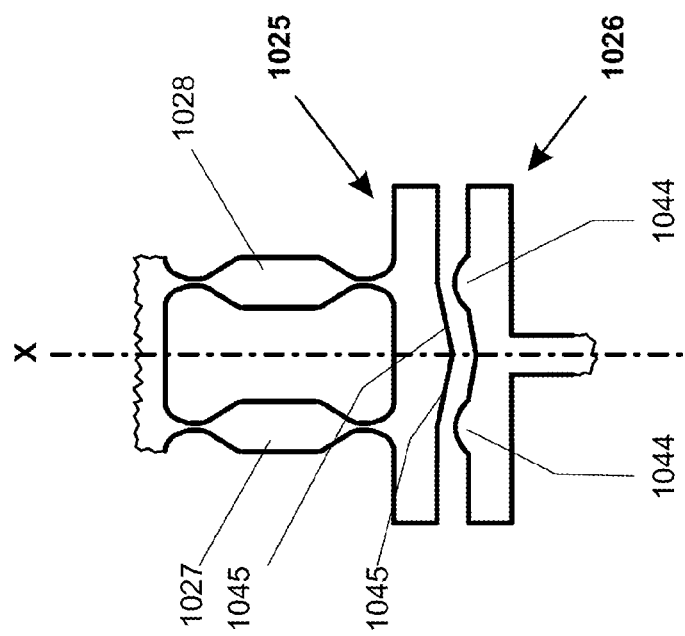
FIG. 10 illustrates a further exemplary embodiment of a parallel-guided coupling mechanism capable of transmitting only a compressive force.

FIG. 10 illustrates a possible configuration for a parallel-guided coupling mechanism designed to transmit only a compressive force. The parallel-guided coupling mechanism includes a second, fixed coupling part 1026 and a first, parallel-guided coupling part 1025 with two parallel elements 1027, 1028 arranged parallel to each other. The parallel elements 1027, 1028 are in this case configured as guide members, each having two flexure pivots, but any other conventional design for parallel-guiding elements could be used instead. The geometric arrangement of the parallel elements enables them to absorb transverse forces that can occur when a force is transmitted through the parallel-guided coupling mechanism.

Given that the forces transmitted in the calibration process are compressive forces and that the two parts 1025, 1026 of the coupling mechanism can never be allowed to buckle under a load, the parallel-guided coupling part 1025 needs to be inherently stable. The fixed coupling part 1026 has a surface facing against the parallel-guided coupling part 1025 with two projections representing first contact locations 1044 which are arranged in mirror symmetry relative to the central longitudinal axis between the two parallel elements 1027, 1028. Further, the parallel-guided coupling part 1025 has two second contact locations 1045 which are facing towards the fixed coupling part 1026 and against which the first contact locations 1044 can seat themselves for force-transmitting contact. Accordingly, this design provides for contact locations 1044, 1045 which lie in a plane that is orthogonal to the central longitudinal axes X of the two parallel elements 1027, 1028 and which serve to center the two parts 1025, 1026 of the coupling mechanism relative to each other when a calibration force is transmitted between them.

As illustrated in FIG. 10, this configuration allows the parallel-guided coupling part 1025 and the fixed coupling part 1026 to be aligned with each other in the calibration process. This allows displacements orthogonal to the central longitudinal axes X of the parallel elements 1027, 1028 to be prevented. To perform their alignment function, the two second contact locations 1045 on the parallel-guided coupling part 1025 are inclined at an obtuse angle relative to each other.

Figure 11:
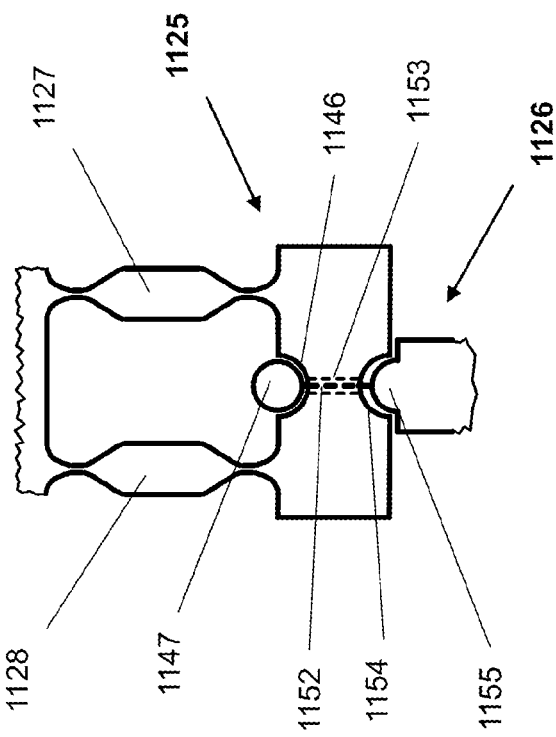
FIG. 11 illustrates another exemplary embodiment of a parallel-guided coupling mechanism capable of transmitting only a tractive force.

FIG. 11 shows a further parallel-guided coupling mechanism with a parallel-guided coupling part 1125 and a fixed coupling part 1126. The parallel-guided coupling part 1125 includes a second traction element 1147 in the form of an indentation which functions as a receiving seat and is located midway between the two parallel elements 1128, 1127 which have flexure pivots in the form of narrow material connections. The fixed coupling part 1126 of the coupling mechanism includes a first traction element 1146 which functions like a projection and is in this case configured as a sphere or a rod. The first traction element 1146 is connected to the fixed coupling part 1126 by way of a connector element 1152 which is arranged essentially in the interior of the parallel-guided coupling part 1125 with clearance to allow free movement. For the centered alignment of the two traction elements, the passage hole 1153 in the parallel-guided coupling part 1125, at the opening that faces away from the traction element 1146, can have a recess 1154 into which a projection 1155 can protrude which is formed on the fixed coupling part 1126.

Returning to FIG. 9, the second traction element shown there could likewise be arranged at least in part inside the coupling part that includes the first traction element, as described for the second traction element in FIG. 11.

Figure 12:
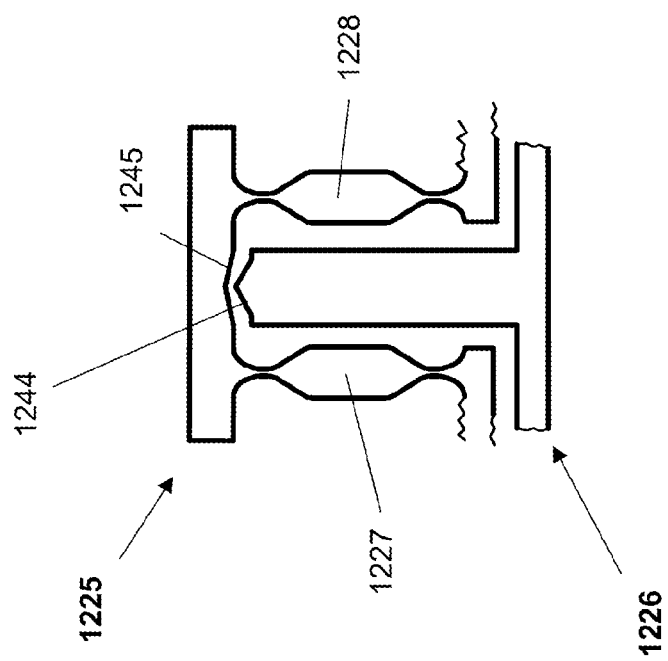
FIG. 12 illustrates another exemplary embodiment of a parallel-guided coupling mechanism capable of transmitting only a compressive force.

FIG. 12 illustrates a further parallel-guided coupling mechanism that is capable of transmitting a compressive force. The parallel-guided coupling mechanism includes a second, fixed coupling part 1226 and a parallel-guided coupling part 1225. The fixed coupling part 1226 has a kind of upstanding post at whose free end a contact location 1244 is formed. The post is arranged between the two parallel elements 1227, 1228 of the parallel-guided coupling part 1225. To transmit a force, the contact location 1244 can be brought into contact with a contact location 1245 which is arranged on the parallel-guided coupling part 1225.

In addition to the embodiments shown in FIGS. 9 to 12, where the first and second parallel elements are shown as leaf springs of flexure pivots, there are other conventional designs that can be used, which are known to persons trained in this field as having a certain inherent stiffness or a limited pivoting range. This property of the parallel elements is advantageous especially in their embodiment as flexure pivots in the upstanding configuration of the parallel-guided coupling part.

Although the invention has been described by presenting specific exemplary embodiments, it is considered obvious that numerous further variants could be created based on the teachings of the present invention, for example by combining the features of the individual examples of embodiments with each other and/or by interchanging individual functional units between the embodiments. Among other possibilities, embodiments of the invention are conceivable which contain, for example, a plurality of calibration weights which can be coupled independently of each other to a lever arrangement by means of parallel-guided and/or unidirectional coupling mechanism as proposed according to the invention. This would make it possible, for example, to realize almost any desired expansion of the weighing range of a balance. Of course, one could also use coupling mechanism, calibration levers and calibration weights that are divided into two or more segments and can be operated independently of each other. Embodiments are also possible in which the calibration lever and the calibration weight are monolithically combined.

Further advantages of the inventive arrangement stem from the fact that, using the same components, different load ranges can be covered if the calibration weight can be mounted on the calibration lever arm at different distances from the fulcrum of the calibration lever. With a suitable design, it would also be possible to arrange an adjustment screw between the calibration weight and the calibration lever for the purpose of adjusting the exact distance between the calibration weight and the fulcrum point of the calibration lever. This allows the calibration force to be set by a precise position adjustment of the weight, so that different production units of the calibration device will have the same calibration force regardless of discrepancies caused by manufacturing tolerances and inhomogeneous materials.

Therefore, while certain exemplary embodiments of the invention are described in detail above, the scope of the invention is not to be considered limited by such disclosure, and modifications are possible without departing from the spirit of the invention as evidenced by the following claims:

What is claimed is:

1. A force-transmitting mechanism of a gravimetric measuring instrument, comprising:
   a stationary portion and a load-receiving portion, the load-receiving portion joined through a force-transmitting connection by way of at least one coupling element and at least one lever, to a measurement transducer that is arranged on the stationary portion;
   a coupling mechanism divided into a first coupling part and a second coupling part; and
   a calibration lever with a fulcrum supported on the load-receiving portion, the calibration lever having a first calibration lever arm that is rigidly connected to a calibration weight and a second calibration lever arm that is connected to the first coupling part of the coupling mechanism;
   wherein the coupling mechanism is arranged between the calibration lever and the at least one lever; and
   wherein either only a tractive force or only a compressive force can be transmitted between the first coupling part and the second coupling part of the coupling mechanism.

2. A force-transmitting mechanism according to claim 1, wherein the coupling mechanism is a parallel-guided coupling mechanism whose first coupling part comprises first and a second parallel elements that are arranged parallel to each other, so that relative transverse movements which occur in the transmission of a force through the coupling mechanism are absorbed by the first and second parallel elements.

3. A force-transmitting mechanism according to claim 1, wherein the coupling mechanism is a unidirectional coupling mechanism whose first coupling part comprises a first flexure pivot and whose second coupling part comprises a second flexure pivot.

4. A force-transmitting mechanism according to claim 1, wherein the first coupling part and the second coupling part of the coupling mechanism each have at least one contact location for the transmission of compressive forces, with the respective contact locations of the first and the second coupling part facing each other.

5. A force-transmitting mechanism according to claim 1, wherein one of the two coupling parts of the coupling mechanism comprises a first traction element with a projection, while the other coupling part includes a second traction element with a concave bearing, wherein the first traction element and the second traction element reach into each other and, when tractive forces are being transmitted, the projection is in contact with the concave bearing.

6. A force-transmitting mechanism according to claim 1, wherein in the operating position of the force-transmitting mechanism, the load-receiving portion is tied to the stationary portion for guided vertical movement by at least one upper parallel guide and by at least one lower parallel guide.

7. A force-transmitting mechanism according to claim 6, wherein the parallel guides of the force-transmitting mechanism are useable to supply current and/or electrical signals to the calibration weight loading device.

8. A force-transmitting mechanism according to claim 6, wherein the force-transmitting mechanism comprises thin wires that are useable to transmit current and/or electrical signals from the stationary portion to the load-receiving portion.

9. A force-transmitting mechanism according to claim 1, wherein the calibration weight is coupled to a calibration weight loading device having a drive source that selectively causes the weight force of the calibration weight to be coupled to, or uncoupled from, the measurement transducer.

10. A force-transmitting mechanism according to claim 9, wherein the calibration weight loading device is arranged on the load-receiving portion.

11. A force-transmitting mechanism according to claim 9, wherein the drive source of the calibration weight loading device includes a self-inhibiting eccentric.

12. A force-transmitting mechanism according to claim 1, wherein the load-receiving portion, the stationary portion, the calibration lever and the coupling mechanism are formed as a monolithically connected unit.

13. A gravimetric measuring instrument comprising:
    the force-transmitting mechanism of claim 1; and
    a load receiver connected to the load-receiving portion of the force-transmitting mechanism.

14. A gravimetric measuring instrument according to claim 13, wherein the force-transmitting mechanism is adapted to transfer the weight force of the calibration weight so that said weight force will act on the measurement transducer in the same direction as a force applied to the load-receiving portion.

15. A gravimetric measuring instrument according to claim 13, wherein the calibration weight is made of the same material as the force-transmitting mechanism and an auxiliary mass is connected to the calibration weight to compensate for the difference in density between said material and another material from which the calibration weight is normally made.

16. A gravimetric measuring instrument according to claim 13, wherein the calibration weight is made of the same material as the force-transmitting mechanism and a pressure sensor is provided and connected to electronics of the instrument for calculating a correction for the air buoyancy of the calibration weight based on measurement by the pressure sensor of the ambient barometric pressure of the gravimetric measuring instrument.

17. A force-transmitting mechanism according to claim 1, wherein the first coupling part and the second coupling part of the coupling mechanism each have at least one contact location for the transmission of compressive forces, with the respective contact locations of the first and the second coupling part facing each other.

18. A force-transmitting mechanism of a gravimetric measuring instrument, comprising:
    a stationary portion and a load-receiving portion, the load-receiving portion joined through a force-transmitting connection directly to a measurement transducer that is arranged on the stationary portion;
    a calibration lever with a fulcrum supported on the load-receiving portion, the calibration lever having a first calibration lever arm associated with a calibration weight and a second calibration lever arm associated with the measurement transducer;

a coupling mechanism interposed between the second calibration lever arm and the measurement transducer and divided into a first coupling part and a second coupling part; and a calibration weight loading device having a drive source that selectively causes, by way of the coupling mechanism, the weight force of the calibration weight to be coupled to, or uncoupled from, the measurement transducer;

wherein either only a tractive force or only a compressive force can be transmitted between the first coupling part and the second coupling part of the coupling mechanism.

19. A force-transmitting mechanism according to claim 18, wherein the coupling mechanism is a parallel-guided coupling mechanism whose first coupling part comprises first and second parallel elements that are arranged parallel to each other, so that relative transverse movements which occur in the transmission of a force through the coupling mechanism are absorbed by the first and second parallel elements.

20. A force-transmitting mechanism according to claim 18, wherein the coupling mechanism is a unidirectional coupling mechanism whose first coupling part comprises a first flexure pivot and whose second coupling part comprises a second flexure pivot.

* * * * *